US008876465B2

(12) United States Patent
Stretton

(10) Patent No.: US 8,876,465 B2
(45) Date of Patent: Nov. 4, 2014

(54) GAS TURBINE ENGINE

(75) Inventor: Richard G. Stretton, Loughborough (GB)

(73) Assignee: Rolls-Royce PLC, London (GB)

(*) Notice: Subject to any disclaimer, the term of this patent is extended or adjusted under 35 U.S.C. 154(b) by 808 days.

(21) Appl. No.: 13/087,877

(22) Filed: Apr. 15, 2011

(65) Prior Publication Data
US 2011/0268563 A1 Nov. 3, 2011

(30) Foreign Application Priority Data

Apr. 28, 2010 (GB) .................................. 1007063.9

(51) Int. Cl.
F01D 17/00 (2006.01)
F01D 25/12 (2006.01)
F02K 3/072 (2006.01)
F02C 7/14 (2006.01)
F02K 3/062 (2006.01)
F01D 25/18 (2006.01)

(52) U.S. Cl.
CPC ................ F01D 25/12 (2013.01); F02K 3/072 (2013.01); F02C 7/14 (2013.01); F02K 3/062 (2013.01); Y02T 50/675 (2013.01); F01D 25/18 (2013.01)
USPC ........................................................ 415/116

(58) Field of Classification Search
USPC ................. 415/116, 117, 144, 176, 178, 179; 60/39.08, 39.83, 782, 785, 795, 806
See application file for complete search history.

(56) References Cited

U.S. PATENT DOCUMENTS

| 2,478,206 | A | * | 8/1949 | Redding ...................... 60/226.1 |
| 3,972,349 | A | | 8/1976 | Tumavicus |
| 5,054,998 | A | * | 10/1991 | Davenport ....................... 416/1 |
| 5,269,135 | A | * | 12/1993 | Vermejan et al. ............ 60/226.1 |
| 5,351,476 | A | * | 10/1994 | Laborie et al. .................. 60/785 |
| 5,438,823 | A | * | 8/1995 | Loxley et al. ................ 60/39.08 |
| 6,000,210 | A | * | 12/1999 | Negulescu ...................... 60/772 |
| 7,398,641 | B2 | * | 7/2008 | Stretton et al. ............. 60/39.093 |
| 2008/0112798 | A1 | * | 5/2008 | Seitzer et al. .................. 415/144 |
| 2008/0230651 | A1 | * | 9/2008 | Porte .......................... 244/118.5 |
| 2009/0007567 | A1 | * | 1/2009 | Porte et al. ...................... 60/785 |
| 2009/0129922 | A1 | * | 5/2009 | Cloft et al. .................. 415/213.1 |

(Continued)

FOREIGN PATENT DOCUMENTS

EP 0 426 500 A1 5/1991
EP 2 189 646 A2 5/2010

OTHER PUBLICATIONS

"Full Scale Technology Demonstration of a Modern Counterrotating Unducted Fan Engine Concept-Design Report;" Dec. 1987; pp. 1-349; National Aeronautics and Space Administration (NASA).

(Continued)

Primary Examiner — Edward Look
Assistant Examiner — Aaron R Eastman
(74) Attorney, Agent, or Firm — Oliff PLC

(57) ABSTRACT

A heat exchanger arrangement for a gas turbine engine. The arrangement including a flow path within an outer cowl, which flow path locates a heat exchanger part way therealong. A valve is provided at an inlet end of the flow path to selectively receive fluid into the flow path from outside of the cowl and/or from a pressurized fluid flow. An exit from the flow path includes a plenum chamber to receive exhausted coolant flows from the heat exchanger and possibly other exhaust flows. The heat exchanger exhaust flow is then utilized to provide cooling to engine structures.

19 Claims, 2 Drawing Sheets

(56) References Cited

U.S. PATENT DOCUMENTS

Figure 1:
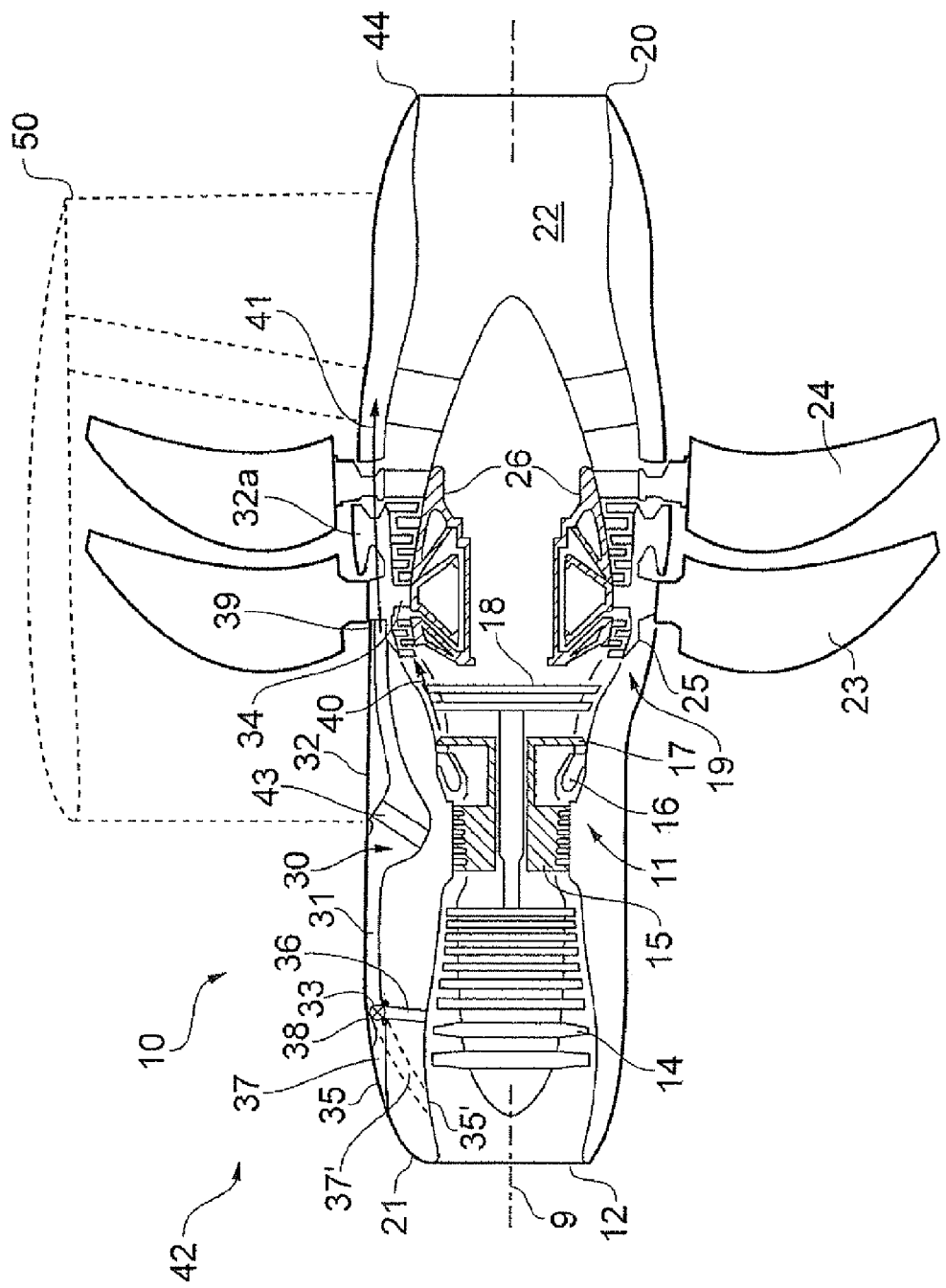

2009/0314004 A1* 12/2009 Van Der Woude .............. 60/785
2011/0179767 A1* 7/2011 Rinjonneau et al. ............ 60/224

OTHER PUBLICATIONS

British Search Report dated Aug. 12, 2010 in corresponding British Application No. 1007063.9.

* cited by examiner

GAS TURBINE ENGINE

The present invention relates to open rotor configuration gas turbine engines having a rear ducted fan or rear propeller arrangement, and particularly heat exchanger arrangements for cooling lubricating oil for gear boxes and engine functions within such engines.

It will be appreciated that within gas turbine engines it is important to cool engine oil as well as gearbox oil through an appropriate heat exchanger. In such circumstances degradation of the engine and lubricating oil can be inhibited. In order to provide effective operation of the heat exchanger generally fan delivery air is utilised to deliver coolant air to the engine oil heat exchanger before that coolant air is exhausted overboard. The pressure difference between fan delivery air and ambient is used to drive the heat exchanger cooling flow. Such exhaustion of the coolant air is typically through a cut-out in an external casing or cowling for the engine and may be projected rearwardly in order to potentially recover some thrust. It will be understood that the coolant air is generally taken from compressor stages and therefore there is a proportional loss of engine efficiency by such coolant flows.

Accommodation of an appropriate flow path from an inlet to an outlet with the heat exchanger intermediate along that path is necessary. With regard to large gas turbine engines accommodation of such a flow path may be acceptable and there is an easier potential for coolant flow extraction. However, with regard to gas turbine engines having a rear ducted fan or rear propeller arrangement, there may be problems with respect to accommodation.

Generally, with regard to an open rotor configuration it is desirable to combine both gearbox and engine lubrication systems and in such circumstances the heat exchanger to cool the oil, can take coolant flow from a pressurised fluid flow generated by the core gas turbine engine. In such circumstances a conventional so called air oil heat exchanger configuration can be utilised with coolant exhausted overboard through cowling doors. However due to increased cooling requirements it will be understood that generally a larger heat exchanger matrix is required with larger exhaust cut-outs in the nacelle cowl. Avoidance at least of such large exhaust cut-outs in the casing or cowling doors would be advantageous as well as the capability with regard to more convenient accommodation of the heat exchanger matrix.

In an open rotor pusher configuration typically the conventional heat exchanger is arranged to exhaust the coolant flow through the nacelle cowling upstream of the rotors. By such an approach the disturbance on the free stream airflow presented to the rotors could result in a noise and performance penalty.

It will be understood that convenient access for coolant flow extraction from by pass flows may not always be available and in such circumstances to avoid necessary weight penalties with dedicated apparatus for generating coolant extraction alternatives are desirable. Such considerations are particularly important where additional requirements are presented with respect to achieving oil cooling for lubricating oil in the gearbox in addition to the engine itself.

According to the present invention there is provided a gas turbine engine, the engine comprising a compressor driven by a turbine, with a combustor located between the compressor and the turbine, a main propulsive rotor is provided downstream of the combustor which rotor is driven by a second turbine, the engine also comprising a heat exchanger arrangement, the arrangement comprising a flow path within an outer cowl, a heat exchanger at an intermediate position along the flow path between an inlet and an outlet, the flow path arranged about a pressurised fluid flow through the engine, the arrangement characterised in that the inlet has a valve selectively movable between a first position to receive into the flow path fluid from outside of the engine, and a second position to receive into the flow path fluid from the pressurised fluid flow, and that the outlet has a plenum chamber associated with the pressurised fluid flow.

The plenum chamber may be also associated with an exhaust path from the casing. Typically, the exhaust path provides a thermal shield between the casing and the pressurised fluid flow.

The heat exchanger may be for air cooling of lubricating oil.

The valve may be a flap valve. A controller may be provided for moving the valve between the first and second positions. A sensor to determine external fluid flow past the outside of the casing may be provided operatively connected to the controller, and configured such that if external fluid flow above a predetermined value is sensed the valve will be in the first position, but otherwise the valve will be in the second position. The valve may be arranged such that it can be selectively configured to receive into the flow path fluid from both the outside of the cowl and from the pressurised fluid flow.

The plenum chamber may be associated with the pressurised fluid flow to draw fluid flow along the flow path.

The flow path may be provided by ducting. The ducting may be integral with the cowl. Possibly, the ducting is provided in cowl doors, and the ducting may be hinged with the cowl doors. The ducting may act to reinforce the cowl.

An exhaust duct from the heat exchanger may be arranged to be in contact with an external surface of the cowl to provide cooling in use of the heat exchanger exhaust.

The plenum chamber may be arranged to receive other fluid flows through the engine.

In one embodiment an opening is provided in an external surface of the outer cowl, leading to the valve, to receive into the flow path fluid from outside of the engine.

In an alternative embodiment an opening is provided in the air intake of the engine upstream of the compressor, leading to the valve, to receive into the flow path fluid from outside of the engine.

An embodiment of aspects of the present invention will now be described by way of example with reference to the accompanying drawings in which:—

Figure 2:
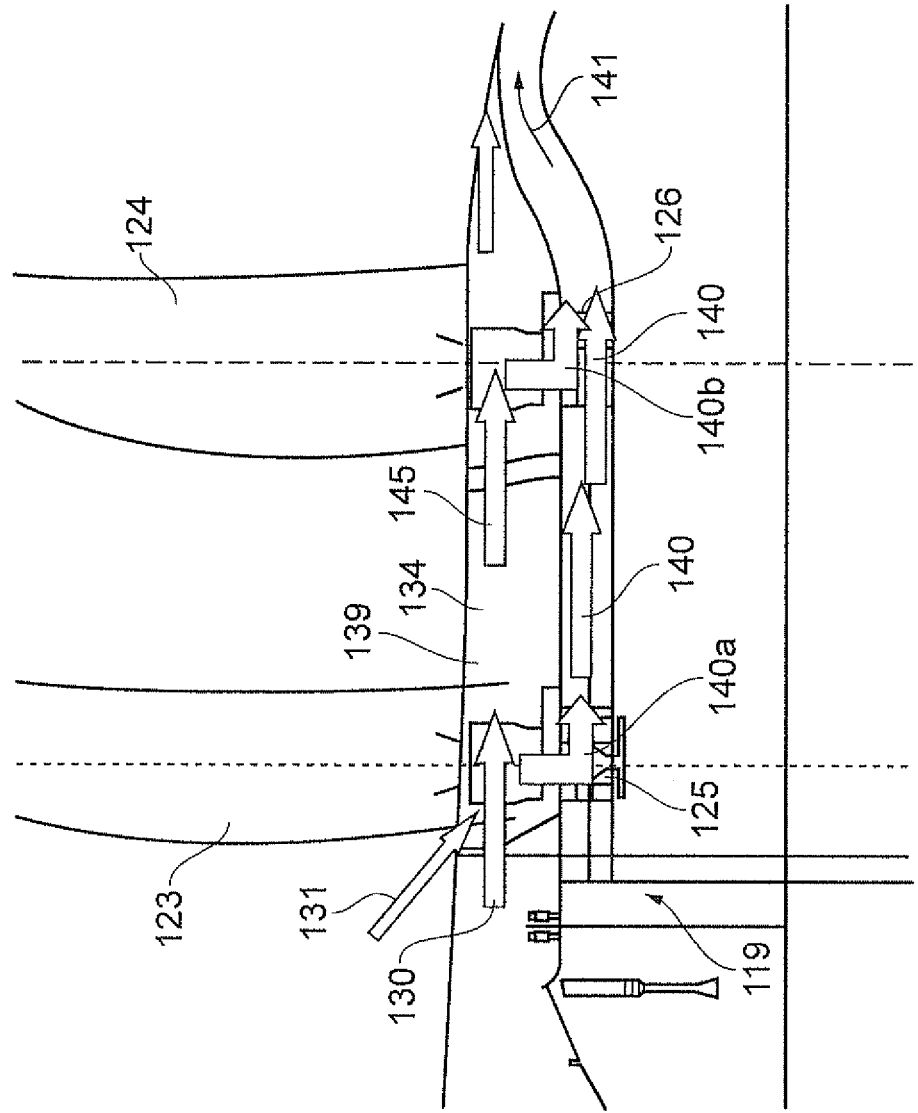

FIG. 1 is a schematic side cross section of a twin-spooled, contra-rotating propeller gas turbine engine, according to the invention; and FIG. 2 is a schematic expanded cross section of a plenum chamber in accordance with aspects of the present invention.

Referring to FIG. 1, a twin-spooled, contra-rotating propeller gas turbine engine is generally indicated at 10 and has a principal and rotational axis 9. The engine 10 comprises a core engine 11 having, in axial flow series, an air intake 12, a low pressure compressor 14 (LPC), a high-pressure compressor 15 (HPC), combustion equipment 16, a high-pressure turbine 17 (HPT), a low pressure turbine 18 (LPT), a free power turbine 19 (FPT) and a core exhaust nozzle 20. A nacelle 21 generally surrounds the core engine 11 and defines the intake 12 and nozzle 20 and a core exhaust duct 22. The engine 10 also comprises two contra-rotating propellers 23, 24 attached to and driven by the free power turbine 19, which comprises contra-rotating blade arrays 25, 26.

An alternative configuration is indicated in FIG. 2 and corresponding elements are labeled with the prefix 100. In this configuration propellers 123, 124 are driven by the free-power turbine 119 and a gearbox. The gas turbine engine 10 works in a conventional manner so that air entering the intake 12 is accelerated and compressed by the LPC 14 and directed into the HPC 15 where further compression takes place. The compressed air exhausted from the HPC 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and low pressure compressors 15, 14 and the propellers 23, 24 by suitable interconnecting shafts. The propellers 23, 24 normally provide the majority of the propulsive thrust.

With such a gas turbine engine 10 it can be noted that both the nacelle cowl 21 and core casing 11 of the engine 10 have a relatively narrow diameter, so as to drive the propellers 23, 24. This narrower diameter in particular in relation to the casing for the engine, reduces the capability and capacity with regard to accepting heat exchanger arrangements for air oil heat exchangers for lubricating engine and gearbox oils.

The engine 10 incorporates a heat exchanger arrangement 30. The heat exchanger arrangement 30 comprises a flow path 31 generally configured to extend within an outer cowl 32 between an inlet 33 and an outlet 34. An opening 35 is provided externally of the outer cowl 32 with a path 37 leading to the inlet 33. Also leading to the inlet 33 is a path 36 to a pressurised fluid flow generated typically by the low pressure turbine 18.

The inlet 33 incorporates a valve 38 to electively switch as required between a first position connecting the flow path 31 to the path 37, and a second position connecting the flow path 31 to the path 36. The outlet 34 generally comprises a plenum chamber extending from a rear bulkhead 39. The plenum chamber as will be described later is either associated with a downstream pressurised fluid flow path 40 or an exhaust path 41 through the outer cowl 32.

A controller is provided to enable switching of the valve 38 between the paths 36, 37 dependent upon the air speed of the engine 10. It will be appreciated if the engine 10 is moving with adequate speed then external air flows in the direction of the arrow 42 may be sufficient to provide adequate heat exchange in a heat exchanger 43 in the path 31 whilst at other stages such as with regard to ground movements, forced air flow through the path 36 will be required to achieve adequate cooling through the heat exchanger 43.

The controller allows switching of the valve 38 between these two sources of coolant flow for the heat exchanger 43 but also may allow both sources of flow to be utilised. The exterior of the inlet path 31 could be arranged to be in contact with the freestream air to provide cooling of the LPC delivery air, before entering the heat exchanger 43.

At the outlet 34 as indicated, a plenum chamber is created. The plenum chamber may be associated with the downstream part of the pressurised fluid flow such that through entrainment by the motive flow of the core stream exhaust flow 40 coolant flow can be drawn through the flow path and the combination then exhausted through the engine exhaust nozzle 44. In such circumstances an exhaust flow is introduced to the main engine core exhaust flow path and creates effectively a thermal shield between the outer parts of the outer counter rotating cowl 32a and a hot pressurised fluid flow path. It may be that a proportion of a coolant exhaust passes along the exhaust path 41, providing cooling for the outer counter rotating structure 32a, thereby providing cooling to the engine structure.

In the above circumstances as indicated, coolant flow typically in the form of air is either taken from the pressurised fluid flow generated by the low pressure compressor 14 or from free stream air flow dependent upon the flight speed for the engine 10. The valve 38 as indicated is mounted at an inlet to allow elective switching by the controller between the potential paths 36, 37 for the flow through the flow path 31.

At low speeds generally the pressurised fluid flow upstream as generated by the low pressure compressor will be utilised as the source of coolant air flow through the path 31 and therefore the heat exchanger 43. When the free stream air 42 external to the cowl 32 is at a sufficiently high forward speed it will be understood that the valve 38 will be switched in order to take that flow 42 and pass it along the flow path 31 to the heat exchanger 43. The heat exchanger 43 will act in a conventional manner to exchange coolant air flow with hot oil taken from the gearbox or engine operations.

The external air flow path 37 can be created through a dedicated chute in an external surface of the outer cowl 32 typically between an intake for the pressurised fluid flow and a casing leading edge.

In an alternative configuration an opening 35' is provided within the engine intake 12 upstream of the low pressure compressor 14, with a path 37' leading to the inlet 33.

As illustrated, typically the heat exchanger 43 will be configured and orientated for accommodation within the outer cowl 32. In such circumstances the heat exchanger 43 will typically be located towards the back of an engine core compartment incorporating the pressurised fluid flow path generated through the compressor, combustor and turbine engine core. Such a position will have more radial depth available and free space than at the front end of the engine core.

As indicated above, the coolant flows within the flow path 31 are generally transferred to the heat exchanger 43 by appropriate ducting forming the flow path. The ducting will typically be integral with the outer cowl 32 to minimise weight. In such circumstances, sections of the cowl doors will incorporate ducting which will be connected together in order to define the flow path 31. By appropriate choice of materials from which the ducting is made, it will be understood that the ducting could provide a stiffening effect to strengthen and reinforce the cowl in use.

Generally, the ducting forming the flow path 31 will be arranged to seal about the hinge and mounting apparatus, allowing such ducting to be hinged upon the cowl doors to improve accessibility to engine core apparatus for maintenance and repair. Also the flow path 31 can be configured to provide cooling from the external ambient airflow. This could either be cooling of the compressor delivery air or cooling of the heat exchanger 43 exhaust flow.

As indicated above, generally a bulkhead 39 is created close to an engine rear mounting plane. This bulkhead 39 will provide appropriate strength for presentation of the flow path and the plenum chamber in accordance with aspects of the present invention. In such circumstances the flow path passes through the bulkhead 39 into the plenum chamber.

In terms of operation, as indicated above the exhausted coolant flow presented to the plenum chamber forming the outlet 34 can be utilised in a number of ways. Firstly, the exhausted flow from the flow path 31 may be arranged to be projected out. Thus, the pressurised flow path downstream at the nozzle 20 effectively entrains the exhausted coolant flow in order to effectively drive the coolant flow through the annulus flow path 41 created between the cowls in use.

Alternatively, as indicated for instance in FIG. 2, above a proportion 140a of the exhausted coolant flow through the path 41 may be projected directly along an exhaust path through an ejector into the flow path 140. In such circumstances, an exhaust coolant flow from the heat exchanger 43 will essentially provide a shield between outer counter rotating cowl portion 32a (FIG. 1) and hot gas flows through an exhaust path. In order to facilitate such flow, vanes may be provided which rotate upon a main rotor hub in order to introduce a drive impulse to the flow.

Struts in the rotating hub assembly will radially span the core exhaust flow and a suction side of the struts could be utilised to propel the flow. Furthermore, by providing dedicated ejector slots it may be possible to provide integration of the rotating hub outer wall and angle the ejector slots to take advantage of axial core flow and the radial velocity of the hub assembly. The exhaust from the rotating strut suction surface or rotating ejector would then be mixed with the main engine core exhaust flow 40.

By the above approach, adequate air flow through the heat exchanger 43 can be achieved based upon bleeding air from the pressurised fluid flow generated by the low pressure compressor 14 or where there is adequate air speed through external flows 42. By providing a dedicated flow path formed from ducting associated with the outer cowl 32 and utilisation of a valve 38, choice of one or the other fluid coolant flows for the heat exchanger 43 can be achieved or where possible a mixture of the two utilised.

In such circumstances the reduction in overall engine efficiency created by bleeding pressurised flow from the compressor stages is reduced when not required by external air flow 42. As indicated, excess freestream air 42 can be utilised if required, and the use of the increased freestream airflow could be utilised to provide a cooling function to the heat exchanger 43, and due to the excess mass flow rate, reduce the heat exchanger exhaust temperature to help with the downstream cooling of the open rotor assembly.

As well as air oil heat exchanger exhaust flow, it will also be appreciated that exhausts from other systems can be presented to the plenum chamber defining the outlet 34. In such circumstances the rear of the engine can be arranged to minimise or eliminate other exhaust flows through the nacelle casing or cowl. Other forms of exhaust which may be located in the plenum includes generator air oil exchanger exhausts, engine handling bleed flow, breather and exhaust flows.

By aspects of the present invention, a more acceptable heat exchanger arrangement accommodation within an open rotor propulsion system utilising a gas turbine engine can be achieved. The architecture of the engine requires minimal change and eliminates exhaust flows through the nacelle or outer cowl resulting in benefits with regard to reduced nacelle drag as a result of steps and gaps. Potential benefits with regard to rotor performance and noise can be achieved whilst minimising exhaust flow and disturbances upstream of the rotors.

As indicated above, generally the air oil heat exchanger exhaust flow will typically be in the order of 200° C. and in such circumstances may shield the open rotor pusher gearbox and cowl 32a from the hot (typically in the order of 600° C.) engine exhaust flows in the exhaust path. By provision of rotation of a rotor hub it is possible to drive the cooling air flow through the exhaust path 41 and therefore further stimulate the exhaust flow.

As indicated above, the outlet 34 in the form of a plenum chamber can be utilised to receive other exhaust flows in order to minimise or eliminate exhaust flows through the nacelle cowl or casing which may reduce operational efficiency. FIG. 2 provides an expanded view of an outlet 34 in which as illustrated above, exhaust flow from an engine air oil heat exchanger as well as exhaust flow from a generator air oil heat exchanger, breather and engine handling bleed flow 130, is presented to the plenum chamber defining the outlet 34.

Thus, the flow can be projected in the direction of the arrow 145, or through an appropriate ejector mixed with pressurised fluid flow in a engine core and in particular the outflow from the turbines of the engine core illustrated in the direction of the arrows 140 such that again flow is stimulated through the heat exchanger whilst avoiding exhaust and openings which may affect operational efficiency in terms of aerodynamics and turbulence as presented to the rotors of the engine. Cooling flow is shown respectively by the arrows 140a and 140b through vanes on the first and second rotor stages.

It will also be understood that external air 131 may also be entrained for additional cooling flow particularly with regard to the flow 145, which as illustrated above with respect to the exit flow in FIG. 1, may be utilised for thermal shielding of the hot gases in an engine core flow 141. The external flow 131 may be removed through the split line between the nacelle cowl or casing and a rotor outer aerosurface.

FIG. 1 shows a contra-rotating propeller gas turbine engine. The invention is also applicable to engines having a rear ducted fan. The position of a rear ducted fan is shown by the dashed lines 50 in FIG. 1.

The present invention enables heat exchanger arrangements to be provided in gas turbine engines of the above described types where space is limited. Such arrangements allow exhausting of the coolant flows from the heat exchanger with reduced problems with respect to noise and performance penalties.

As indicated above it is through elective switching between the air flows into the flow path from external flow sources 42 and pressurised fluid flows which allows more efficient operation whilst maintaining adequate air flow through the heat exchangers for operational efficiency.

Other modifications and alterations to aspects of the present invention will be appreciated by persons skilled in the technology. Thus, as illustrated above generally a valve switchable between external and pressurised flow paths will be utilised for presenting flows into the flow path for the heat exchanger. In such circumstances generally a controller will be provided which will act to configure the valve appropriately.

The controller will be associated with a sensor to determine air speed with regard to the external air flow 42 and should that air flow be sufficient the sensor will provide a signal. If the signal is above a particular level then the controller will be arranged to configure the valve in the second position to take the external flow 42, or the pressurised flow or a mixture dependent upon requirements.

It will be appreciated the controller may also incorporate means for determining the necessary operational functionality with respect to the heat exchanger 43. In such circumstances during periods of high demand greater air flow may be obtained by combinations of the external flow and the pressurised flow in order to cool oil or otherwise in the heat exchanger 43 more appropriately. In such circumstances the controller will set the valve dependent upon requirements. The controller may also act with regard to the plenum chamber in terms of the ejector into the core flow 40 to again facilitate by pressure differentials, further drawing and pulling of air flow through the flow path 31 as required.

The invention claimed is:

1. A gas turbine engine comprising a compressor driven by a turbine, with a combustor located between the compressor and the turbine, a main propulsive rotor is provided downstream of the combustor which rotor is driven by a second turbine, the engine also comprising a heat exchanger arrangement, the heat exchanger arrangement comprising a flow path within an outer cowl, a heat exchanger at an intermediate position along the flow path between an inlet and an outlet, the flow path arranged about a pressurized fluid flow through the engine, the inlet has a valve selectively movable between a first position to receive into the flow path fluid from outside of the engine, and a second position to receive into the flow path fluid from the pressurized fluid flow, and that the outlet has a plenum chamber associated with the pressurized fluid flow.

2. An engine as claimed in claim 1 wherein the plenum chamber is also associated with an exhaust path from the cowl.

3. An engine as claimed in claim 2 wherein the exhaust path provides a thermal shield between the cowl and the pressurized fluid flow.

4. An engine as claimed in claim 1 wherein the plenum chamber is also associated with an exhaust path to provide cooling to the engine structure.

5. An engine as claimed in claim 1 wherein the heat exchanger is for air cooling of lubricating oil.

6. An engine as claimed in claim 1 wherein the valve is a flap valve.

7. An engine as claimed in claim 1 wherein a controller is provided for moving the valve between the first and second positions.

8. An engine as claimed in claim 7 wherein a sensor to determine external fluid flow past the cowl is provided operatively connected to the controller, and configured such that if external fluid flow above a predetermined value is sensed the valve will be in a first position, but otherwise the valve will be in the second position.

9. An engine as claimed in 7 wherein the valve can be selectively configured to receive into the flow path fluid from both outside of the cowl and from the pressurized fluid flow.

10. An engine as claimed in claim 1 wherein the plenum chamber is associated with the pressurized fluid flow to draw fluid flow along the flow path.

11. An engine as claimed in claim 1 wherein the flow path is provided by distinct ducting.

12. An engine as claimed in claim 11 wherein the ducting is integral with the cowl.

13. An engine as claimed in claim 11 wherein the ducting is provided in cowl doors.

14. An engine as claimed in claim 11 wherein the ducting acts to reinforce the cowl.

15. An engine as claimed in claim 11 wherein the ducting is hinged with the cowl doors.

16. An engine as claimed in claim 1 wherein an exhaust duct from the heat exchanger is arranged to be in contact with an external surface of the cowl to provide cooling in use of the heat exchanger exhaust.

17. An engine as claimed in claim 1 wherein the plenum chamber is arranged to receive other fluid flows through the engine.

18. An engine as claimed in claim 1 wherein an opening is provided in an external surface of the outer cowl, leading to the valve, to receive into the flow path fluid from outside of the engine.

19. An engine as claimed in claim 1 wherein an opening is provided in the air intake of the engine upstream of the compressor, leading to the valve, to receive into the flow path fluid from outside of the engine.

* * * * *